(12) United States Patent
Arai et al.

(10) Patent No.: US 10,113,518 B2
(45) Date of Patent: Oct. 30, 2018

(54) AIR INTAKE DUCT FOR MOTORCYCLE

(71) Applicant: Kawasaki Jukogyo Kabushiki Kaisha, Kobe-shi, Hyogo (JP)

(72) Inventors: Kozo Arai, Kobe (JP); Toshiyuki Tsubone, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 52 days.

(21) Appl. No.: 15/372,767

(22) Filed: Dec. 8, 2016

(65) Prior Publication Data

US 2017/0089307 A1 Mar. 30, 2017

Related U.S. Application Data

(63) Continuation of application No. PCT/JP2014/065937, filed on Jun. 16, 2014.

(51) Int. Cl.
*F02M 35/10* (2006.01)
*F02M 35/16* (2006.01)
(Continued)

(52) U.S. Cl.
CPC ........ *F02M 35/10144* (2013.01); *B62M 7/02* (2013.01); *F02M 35/02* (2013.01);
(Continued)

(58) Field of Classification Search
CPC ............. F02M 35/10; F02M 35/10006; F02M 35/10013; F02M 35/10091; F02M 35/02;
(Continued)

(56) References Cited

U.S. PATENT DOCUMENTS 6,199,888 B1 3/2001 Ito
8,162,101 B2 4/2012 Ono
(Continued)

FOREIGN PATENT DOCUMENTS

EP 2489849 8/2012
GB 1448189 A 9/1976
(Continued)

OTHER PUBLICATIONS

English Language Translation of the International Preliminary Report on Patentability (dated Dec. 29, 2016) for PCT/JP2014/065937 (5 pages).
(Continued)

*Primary Examiner* — Jacob Amick

(57) ABSTRACT

An air intake duct (50) for a motorcycle supplies air taken in through an air inlet (24) in a front portion of a vehicle body to an engine (E) located at a center portion, in a longitudinal direction of the motorcycle, of the vehicle body. The air intake duct (50) includes a duct front (69) having the air inlet (24) formed at a front end thereof, and a duct body (70) removably coupled to a rear end portion of the duct front (69). The duct body (70) extends in the longitudinal direction so as to pass through an outer lateral side of the engine (E) and is removably connected at a rear end portion thereof to an air cleaner (40). In a state in which the duct body (70) is removed from the air cleaner (40), a cleaner element (87) can be attached and removed.

9 Claims, 7 Drawing Sheets

(51) Int. Cl.
*B62M 7/02* (2006.01)
*F02M 35/02* (2006.01)
*F02M 35/024* (2006.01)
*F16L 25/08* (2006.01)

(52) U.S. Cl.
CPC ...... *F02M 35/0204* (2013.01); *F02M 35/024* (2013.01); *F02M 35/0207* (2013.01); *F02M 35/02416* (2013.01); *F02M 35/10157* (2013.01); *F02M 35/10236* (2013.01); *F02M 35/10255* (2013.01); *F02M 35/10262* (2013.01); *F02M 35/10321* (2013.01); *F02M 35/10347* (2013.01); *F02M 35/10354* (2013.01); *F02M 35/162* (2013.01); *F16L 25/08* (2013.01); *Y02T 10/144* (2013.01); *Y02T 10/146* (2013.01)

(58) Field of Classification Search
CPC ....... F02M 35/10157; F02M 35/10255; F02M 35/10144; F02M 35/10347; F02M 35/10354; F02M 35/162; B62M 7/02
See application file for complete search history.

(56) References Cited

U.S. PATENT DOCUMENTS

| | | | |
|---|---|---|---|
| 8,707,931 | B2 | 4/2014 | Arima et al. |
| 9,638,149 | B2 | 5/2017 | Naruoka et al. |
| 2005/0051375 | A1* | 3/2005 | Momosaki ....... F02M 35/10013 180/219 |
| 2006/0006016 | A1* | 1/2006 | Nishizawa .......... F02M 35/022 180/219 |
| 2012/0192839 | A1 | 8/2012 | Arima et al. |
| 2015/0107563 | A1 | 4/2015 | Naruoka et al. |
| 2015/0114599 | A1 | 4/2015 | Naruoka et al. |
| 2015/0114745 | A1 | 4/2015 | Naruoka et al. |
| 2015/0122232 | A1 | 5/2015 | Naruoka et al. |

FOREIGN PATENT DOCUMENTS

| | | |
|---|---|---|
| JP | 07-069265 | 3/1995 |
| JP | 2000-085651 | 3/2000 |
| JP | 2001-082269 | 3/2001 |
| WO | WO2014/010648 | 1/2014 |
| WO | WO2014/010649 | 1/2014 |
| WO | WO2014/010650 | 1/2014 |
| WO | WO2014/010651 | 1/2014 |

OTHER PUBLICATIONS

International Search Report with English Language Translation for PCT/JP2014/065937, 5 pages.

Extended and Supplementary Search Report dated Nov. 28, 2017 for Corresponding European Patent Application No. 14895112.2 (7 pages).

Decision of Grant dated Dec. 5, 2017 for Corresponding Japanese Patent Application No. 2016-528675 (3 pages).

* cited by examiner

AIR INTAKE DUCT FOR MOTORCYCLE

CROSS REFERENCE TO THE RELATED APPLICATION

This application is a continuation application, under 35 U.S.C § 111(a) of international patent application No. PCT/JP2014/065937, filed Jun. 16, 2014.

BACKGROUND OF THE INVENTION

Field of the Invention

The present invention relates to an air intake duct for a motorcycle which air intake duct supplies air taken in through an air inlet in a front portion of a vehicle body to an engine located at a center portion, in a front-rear or longitudinal direction, of the vehicle body.

Description of Related Art

A motorcycle has been known in which an air intake duct supplies air taken in through an air inlet in a front portion of a vehicle body to an engine (e.g., Patent Document 1). The air intake duct of Patent Document 1 extends in the longitudinal direction of the motorcycle so as to pass through a lateral side of the engine.

RELATED DOCUMENT

Patent Document

[Patent Document 1] WO2014/010651

The air intake duct of Patent Document 1 has a long dimension in the longitudinal direction, and therefore, it requires a lot of work to remove the air intake duct from the vehicle body. Therefore, it is difficult to access vehicle mounted devise disposed inward of the air intake duct in a vehicle widthwise direction.

SUMMARY OF THE INVENTION

It is an object of the present invention to provide an air intake duct for a motorcycle, in which an inner device disposed inward of the air intake duct in a vehicle widthwise direction can be easily attached and removed.

In order to achieve the above-described object, an air intake duct for a motorcycle according to the present invention supplies air taken in through an air inlet at a front portion of a vehicle body to an engine located at a center portion, in a front-rear direction or longitudinal direction, of the vehicle body, the air intake duct including: a duct body extending in the longitudinal direction so as to pass through a lateral side, in a vehicle widthwise direction, of the engine and removably connected at a rear end portion thereof to the engine; and a duct front removably coupled to a front end portion of the duct body, the duct front having the air inlet and being supported by a vehicle body frame, in which case in a state in which the duct body is removed from the engine, at least a portion of an inner device located inward of the duct body in the vehicle widthwise direction is exposed to enable the inner device to be attached and removed.

Here, the "inner device" refers to a vehicle-mounted device that is located inward of the duct body in the vehicle widthwise direction and is not accessible from the outside in a state in which the duct body is attached to the vehicle body, but is accessible from the outside in a state in which the duct body is removed from the vehicle body. The inner device is an air cleaner, for example.

With the above-described configuration, it is made possible to access the inner device, by removing the duct body while the duct front is kept attached to the vehicle body, thus enabling the inner device to be easily attached and removed. This facilitates maintenance and fault or defect identification of the inner device and replacement of consumables. For example, when the inner device is an air cleaner, replacement of a cleaner element is facilitated.

In the present invention, the duct front may be covered from an outer lateral side by a cowling or fairing located at the front portion of the vehicle body, and the duct body may be exposed to the outer lateral side from the fairing. With this configuration, the duct body is exposed from the fairing, and it is therefore possible to remove the duct body without removing the fairing. This further facilitates attachment and removal of the inner device. By covering the duct front with the fairing, it is possible to conceal a joint between the duct body and the duct front.

When the duct front is covered from the outer lateral side by the fairing, the front end portion of the duct body may be coupled to a rear portion of the duct front by insertion in the longitudinal direction. With this configuration, it is possible to assuredly prevent interference between the fairing and the duct body during attachment and removal of the duct body, as compared to the case where the connection is achieved by insertion in the vehicle widthwise direction.

When the duct body is exposed from the fairing, the duct body and the duct front may be formed of materials different from each other. The duct front is formed of, for example, polypropylene (PP), and the duct body is formed of, for example, a material that can be more easily subjected to surface decoration treatment than the material of the duct front. The material that can be more easily subjected to surface decoration treatment is a material on which a decorative film such as coating or metal plating is easily formed, and examples thereof include an ABS resin (acrylonitrile-butadiene-styrene copolymer synthetic resin). With this configuration, the appearance of the motorcycle is enhanced, and more options are available for the material of the duct front that is not exposed to the outside, increasing the degree of freedom of design.

When the duct front is covered from the outer lateral side by the fairing, the duct body and the duct front may be removably connected at upper portions thereof by means of a fastening member, and the fairing may cover the fastening member from the outer lateral side, and has an opening for exposing the fastening member upward. With this configuration, the fastening member is prevented from being visible from the outer lateral side, and the fastening member is more easily accessed from above. As a result, attachment and removal of the duct body are facilitated.

In the present invention, the front end portion of the duct body may cover a rear end portion of the duct front around an entire periphery thereof from a radially outer side. With this configuration, the air resistance or pipe loss in the air intake duct is reduced as compared to the case where the connection is made such that the duct body is located inside the duct front.

In the present invention, the duct body may be formed as a unitary article or a single-piece member obtained by blow molding. With this configuration, the duct body has no joint line unlike the case where the duct body is formed by joining of segments, and therefore, irregularities inside the duct body are reduced, resulting in a lower air resistance.

In the present invention, a projection protruding toward the vehicle body frame may be integrally formed on the duct body by molding, and the projection may be engaged with an engagement hole formed in the vehicle body frame. With this configuration, it is possible to form a support portion while preventing formation of a protruding object within the duct body so as to avoid an increase in the air resistance.

An air intake apparatus for a motorcycle according to the present invention includes: the air intake duct according to the present invention; a cleaner element configured to clean air taken in from the air intake duct; a supercharger connected to a downstream side of the cleaner element with respect to a flow direction of the air; a relief valve configured to adjust a pressure at a downstream side of the supercharger with respect to the flow direction of the air; and a relief passage through which an outlet of the relief valve communicates with a clean chamber located at a downstream side of the cleaner element with respect to the flow direction of the air, in which case the clean chamber is provided with a protection member configured to prevent relief air discharged from an outlet of the relief passage from directly striking the cleaner element. With this configuration, the protection member can prevent high-temperature relief air from directly striking the cleaner element, thus protecting the cleaner element.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, preferred embodiments of the present invention will be described with reference to the drawings. As used herein, a right-left direction refers to a right-left direction as viewed from a rider riding a motorcycle.

Figure 1:
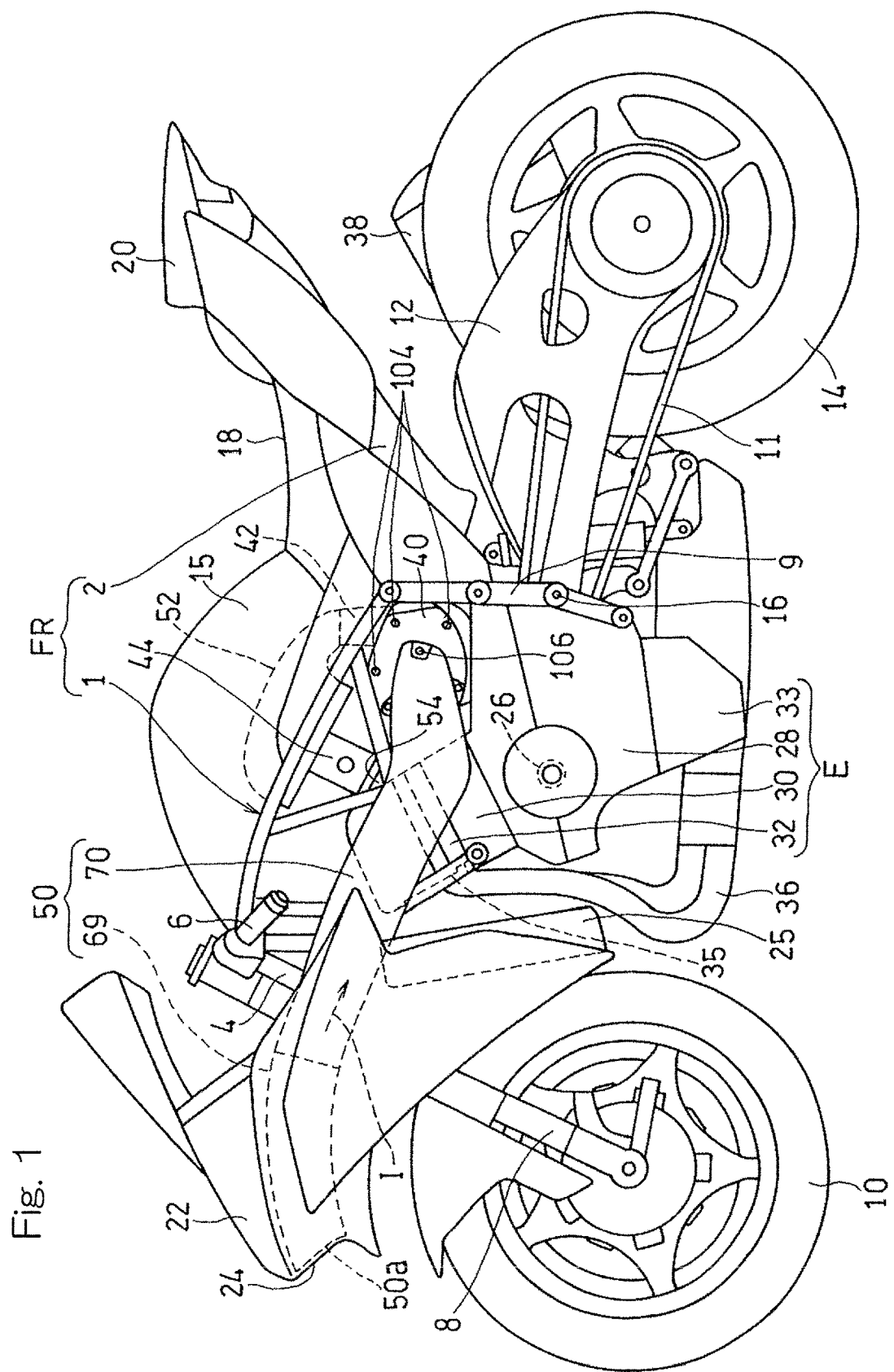
FIG. 1 is a side view showing a motorcycle including an air intake duct according to an embodiment the present invention.

FIG. 1 is a side view of a motorcycle including an air intake duct according to a first embodiment of the present invention. A vehicle body frame FR of the motorcycle includes a main frame 1 that forms a front half thereof and a rear frame 2 that forms a rear half thereof. A head pipe 4 is provided at the front end of the main frame 1, and a front fork 8 is pivotably supported by the head pipe 4 through a steering shaft (not shown). A steering handle 6 is fixed to an upper end portion of the front fork 8, and a front wheel 10 is attached to a lower end portion of the front fork 8.

A swing arm bracket 9 is provided at a rear end portion of the main frame 1. A swing arm 12 is supported so as to be swingable in a vertical direction about a pivot shaft 16 attached to the swing arm bracket 9. A rear wheel 14 is rotatably supported at a rear end portion of the swing arm 12.

An engine E is attached to a center lower portion of the vehicle body frame FR at the front side of the swing arm bracket 9. The engine E drives the rear wheel 14 through a drive chain 11. The engine E is a parallel multi-cylinder engine including a plurality of cylinders aligned in the axial direction of a crankshaft 26 or a vehicle widthwise direction. In the present embodiment, the engine E is a four-cylinder four-cycle, multi-cylinder engine. However, the type of the engine E is not limited thereto.

The engine E includes a crank case 28 that supports the crankshaft 26, a cylinder block 30 protruding upward from the upper surface of a front portion of the crank case 28, a cylinder head 32 located above the cylinder block 30, and an oil pan 33 coupled to a lower portion of the crank case 28. The cylinder block 30 and the cylinder head 32 are inclined forward. That is, the engine E is substantially L-shaped in side view.

Four exhaust pipes 36 are connected to four exhaust ports 35 on the front surface of the cylinder head 32. The four exhaust pipes 36 are merged below the engine E, and are connected to an exhaust muffler 38 disposed at the right side of the rear wheel 14. A radiator 25 is disposed in front of the engine E.

A fuel tank 15 is disposed at an upper portion of the main frame 1, and a driver seat 18 and a passenger seat 20 are supported by the rear frame 2. A cowling or fairing 22 made of resin is mounted on a front portion of the vehicle body. The fairing 22 is supported via a fairing stay (not shown) fixed to the vehicle body frame FR, and covers a portion from the front of the head pipe 4 to the lateral side of the vehicle body front portion, more specifically, covers a portion located below the handle 6 and extending to the outer lateral side of the radiator 25. The fairing 22 has an air inlet 24 therein. The air inlet 24 is located at the front end of the fairing 22, and intake air is introduced from the outside to the engine E through the air inlet 24.

An air intake duct 50 is disposed at the left side of the vehicle body frame FR. The air intake duct 50 is supported by the head pipe 4 such that a front end opening 50a thereof faces the air inlet 24 of the fairing 22. The pressure of the air introduced from the front end opening 50a of the air intake duct 50 is increased by a ram effect. The details of the air intake duct 50 will be described later.

An air cleaner 40 that purifies intake air and a supercharger 42 are disposed rearward of the cylinder block 30 and on the upper surface of a rear portion of the crank case 28 so as to be aligned in a vehicle widthwise direction, with the air cleaner 40 disposed at the outer side. The air cleaner 40 forms an inner device according to the present invention. The air intake duct 50 extends from a region ahead of the engine E so as to pass through the left outer lateral side of the cylinder block 30 and the cylinder head 32, and guides incoming wind as intake air to the air cleaner 40. The supercharger 42 pressurizes air purified by the air cleaner 40 and supplies the pressurized air to the engine E.

An air intake chamber 52 is disposed between the supercharger 42 and an air intake port 54 of the engine E, and the supercharger 42 and the air intake chamber 52 are directly connected with each other. The air intake chamber 52 stores the high-pressure intake air supplied from the supercharger 42. A throttle body 44 is disposed between the air intake chamber 52 and the air intake port 54. The air intake chamber 52 is disposed above the supercharger 42 and the throttle body 44 and rearward of the cylinder head 32. The air cleaner 40 is disposed between the crank case 28 and the air intake chamber 52 in side view. The fuel tank 15 is disposed above the air intake chamber 52 and the throttle body 44.

Figure 2:
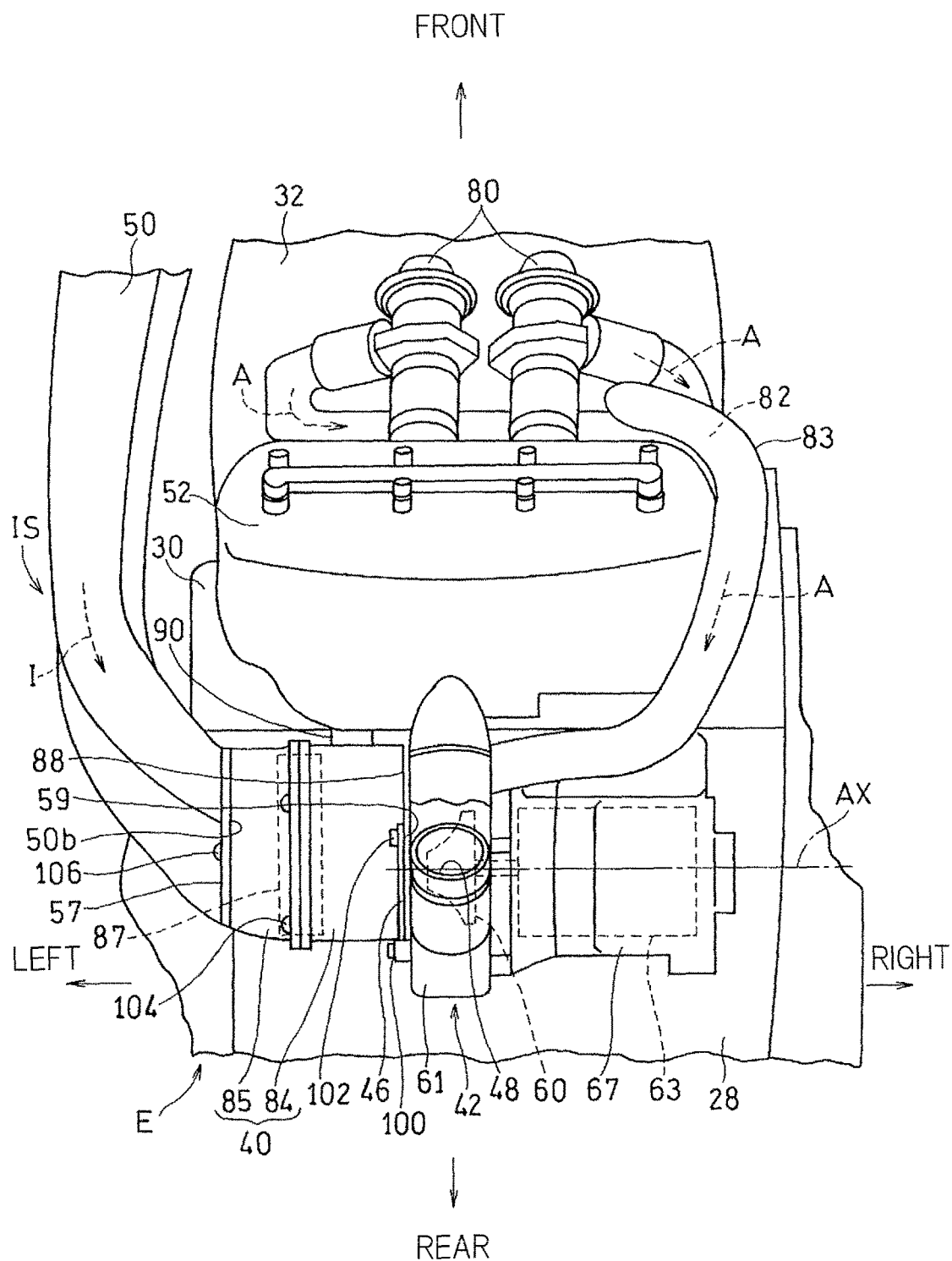
FIG. 2 is a perspective view of an engine of the motorcycle as viewed from the rear and obliquely above.

As shown in FIG. 2, the supercharger 42 is disposed at the right side of and adjacent to the air cleaner 40 and is fixed to the upper surface of the crank case 28 by means of a bolt (not shown). The supercharger 42 has a rotation axis AX extending in the vehicle widthwise direction. A suction port 46 of the supercharger 42, that is open leftward, is located above the crank case 28 and at a center portion, in the widthwise direction, of the engine E, and a discharge port 48 of the supercharger 42 is located rearward of the rotation axis AX and at the center portion, in the vehicle widthwise direction, of the engine E.

The supercharger 42 includes an impeller 60 that pressurizes intake air, an impeller housing 61 that accommodates the impeller 60, a transmission mechanism 63 that transmits the power of the engine E to the impeller 60, and a transmission mechanism housing 67 that accommodates the transmission mechanism 63. The transmission mechanism 63 and the air cleaner 40 are disposed with the impeller housing 61 interposed therebetween in the vehicle widthwise direction. The impeller housing 61 of the supercharger 42 is coupled to the transmission mechanism housing 67 by means of a plurality of bolts 100 and is coupled to the air cleaner 40 by means of a plurality of bolts 102.

Relief valves 80 configured to adjust the air pressure of the air intake chamber 52, that is, the pressure at the downstream side of the supercharger 42 are provided at a front portion of the air intake chamber 52. A relief pipe 83 constituting a relief passage 82 through which high-pressure air A is sent to the air cleaner 40 is connected to the relief valves 80. The relief pipe 83 extends rearward and obliquely downward so as to pass through the right lateral side of the air intake chamber 52, and then extends below the air intake chamber 52 and between the supercharger 42 and the cylinder block 30 and the cylinder head 32 toward the left lateral side, so as to be connected to the air cleaner 40. The air intake duct 50, the air cleaner 40, the supercharger 42, the relief valves 80, and the relief passage 82, that is, a group of intake system devices cooperates together to form an air intake apparatus IS for the motorcycle.

A cleaner outlet 59 of the air cleaner 40 is connected to the suction port 46 of the supercharger 42, and a rear end portion 50b of the air intake duct 50 is connected to a cleaner inlet 57 of the air cleaner 40 from the outer side in the vehicle widthwise direction. The details of the air cleaner 40 will be described later.

Figure 3:
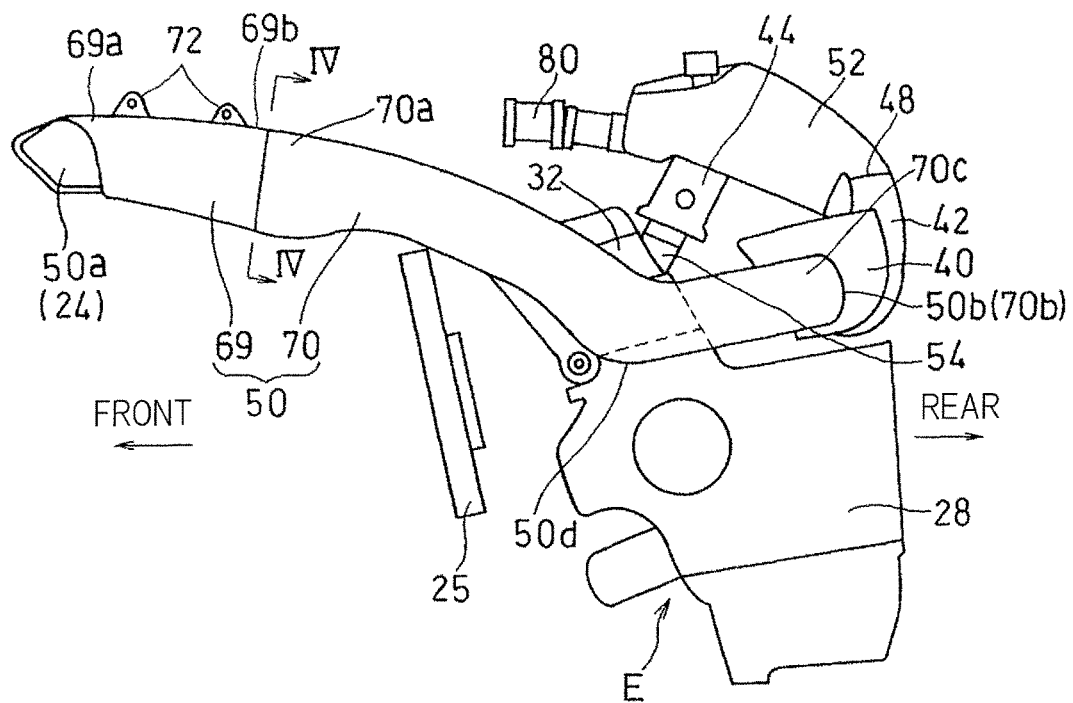
FIG. 3 is a side view showing a major portion of the motorcycle.

As shown in FIG. 3, the air intake duct 50 includes a duct front 69 at the upstream side thereof and a duct body 70 at the downstream side thereof with respect to a flow direction of the intake air. A cross-sectional shape of the air intake duct 50 is not uniform from the upstream side toward the downstream side, but is a substantially rectangular shape having rounded corners. The duct front 69 has a front end portion 69 provided with the air inlet 24 and a rear end portion 69a removably coupled to a front end portion 70a of the duct body 70. The duct body 70 extends in a front-rear direction or longitudinal direction of the motorcycle so as to pass through a lateral side, which is a left lateral side in the present embodiment, of the engine E in the vehicle widthwise direction, and is then removably connected to the air cleaner 40 at a rear end portion 70b thereof that forms the duct rear end portion 50b.

As shown in FIG. 1, the duct front 69 is located frontward of the head pipe 4 and is covered in its entirety by the fairing 22 from the outer lateral side. As can be seen from FIG. 5, most of the duct front 69 is covered by the fairing 22 also from above. Most of the duct body 70, excluding its front portion, is exposed to the outer lateral side from the fairing 22.

The duct body 70 and the duct front 69 are formed of materials different from each other, and the duct body 70 is formed of a material that can be more easily subjected to surface decoration treatment than the material of the duct front 69. Specifically, in the present embodiment, the duct body 70 is formed as a unitary article or single-piece member obtained by blow molding an ABS resin (acrylonitrile-butadiene-styrene copolymer synthetic resin), and the duct front 69 is formed as a unitary article obtained by blow molding polypropylene (PP). However, the materials of the duct body 70 and the duct front 69 are not limited thereto.

The duct body 70 is formed to have a larger length in the longitudinal direction and a smaller cross-sectional area than the duct front 69. Accordingly, the duct body 70 is preferably formed by a production method that achieves a smaller surface roughness than the duct front 69. In this respect as well, the duct body 70 is preferably formed as a unitary article obtained by blow molding. This can suppress the air resistance or pipe loss during passage through the inside of the duct body 70.

Figure 4:
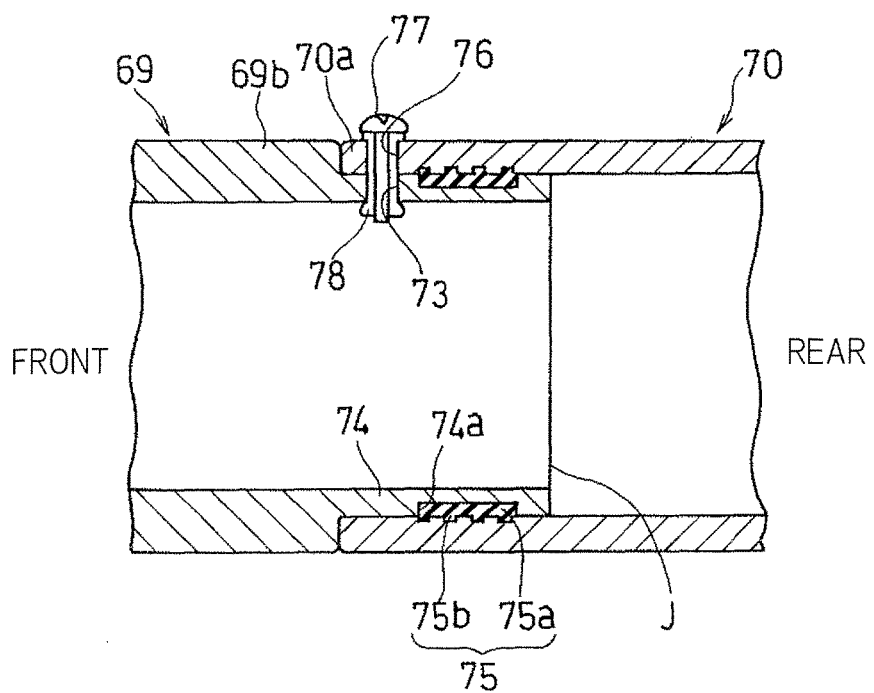
FIG. 4 is a vertical cross-sectional view taken along the line IV-IV in FIG. 3.

The duct body 70 and the duct front 69 are coupled with each other by insertion in the longitudinal direction. More specifically, as shown in FIG. 4, a connection portion 74 having an outer surface recessed radially inward is formed at a rear end portion 69b of the duct front 69, and a first through hole 73 is formed in the connection portion 74. The air intake duct 50 has a substantially rectangular transverse cross-sectional shape, but in the following description, an outward direction from the center of the transverse cross-section is referred to as "radially outward", and a direction toward the center is referred to as "radially inward". The first through hole 73 is provided only at one location in an upper portion of the air intake duct 50. Additionally, a peripheral groove 74a extending around the entire periphery is formed on the connection portion 74 and rearward of the first through hole 73, and a seal member 75 made of an elastic body such as rubber is mounted on the peripheral groove 74a.

The seal member 75 includes a base portion 75a housed in the peripheral groove 74a and extending around the entire periphery, and a plurality of protruding portions 75b protruding radially outward from the base portion 75a and extending around the entire periphery. The base portion 75a has a thickness that is equal to or slightly smaller than the depth of the peripheral groove 74a, and the protruding portions 75b protrude radially outward of an edge portion of the peripheral groove 74a. Although four protruding portions 75b are provided so as to be aligned in the longitudinal direction in the present embodiment, the number of protruding portions 75b is not limited thereto. The use of the seal member 75 composed of the base portion 75a and the protruding portions 75b enables the duct body 70 to be easily fitted to the duct front 69, thus improving the assemblability while ensuring air-tightness of the coupling portion.

A second through hole 76 is formed in the front end portion 70a of the duct body 70 at a position corresponding to the first through hole 73. In a state in which the front end portion 70a of the duct body 70 is inserted from the rear to the outer periphery of the connection portion 74 of the rear end portion 69b of the duct front 69, a fastening member 77 such as a bolt is inserted through the second through hole 76 and the first through hole 73 in this order, and is fastened to a rubber nut 78, whereby the duct body 70 and the duct front 69 are removably connected with each other. In the connected state, the front end portion 70a of the duct body 70 covers the connection portion 74 of the duct front 69 around the entire periphery from the radially outer side, and the outer face of the front end portion 70a of the duct body 70 and the outer face of the rear end portion 69b of the duct front 69 are flush with each other.

Figure 5:
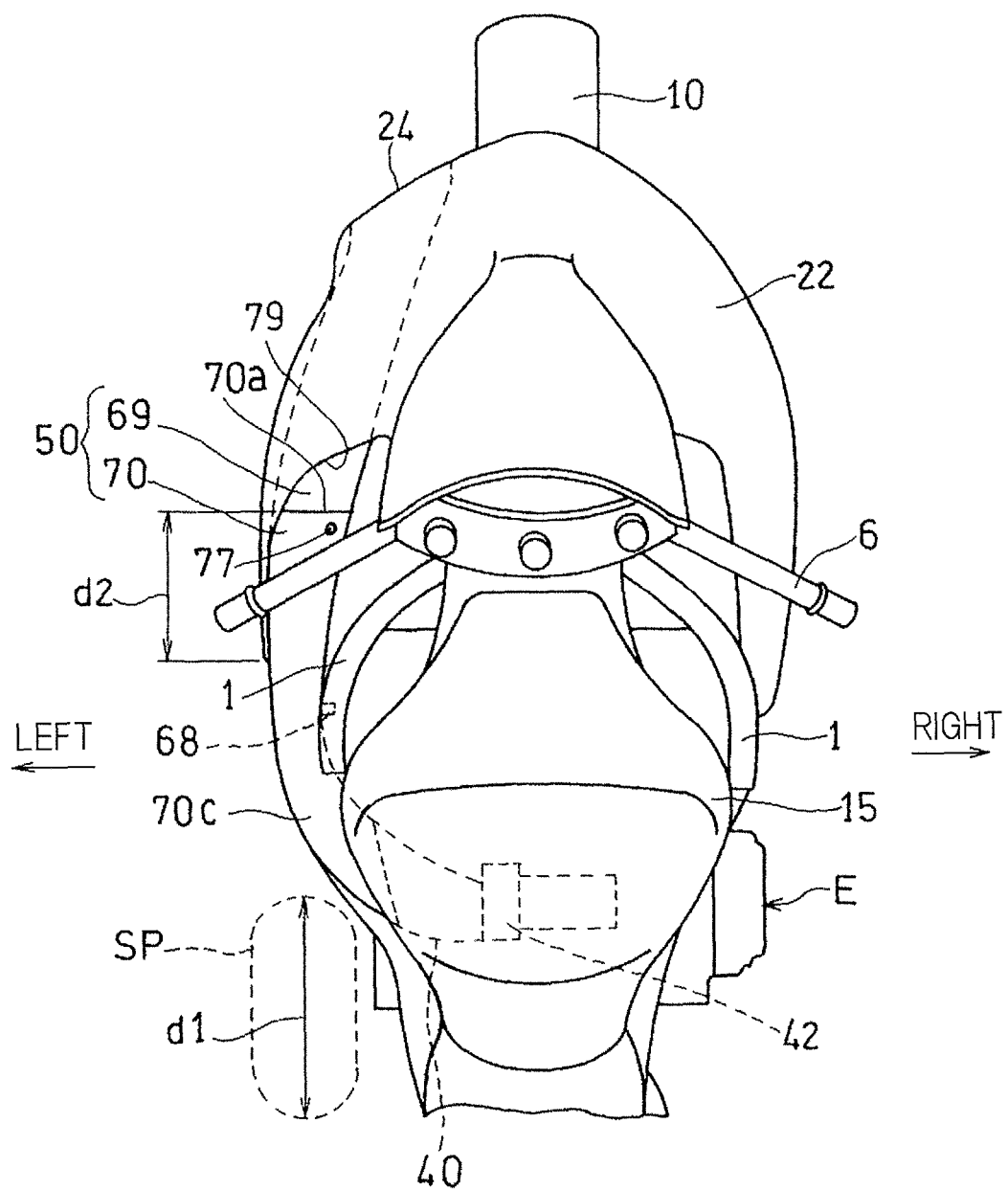
FIG. 5 is a plan view showing a front portion of the motorcycle.

As shown in FIG. 5, the fastening member 77 is covered by the fairing 22 from the outer lateral side and is exposed upward from the opening 79. The parting line (not shown) of the blow molding of the duct body 70 is present at the inner side of the vehicle body.

The duct body 70 shown in FIG. 3 is configured such that its cross-sectional area thereof gradually decreases from the front end portion 70a, which is an upstream portion of the intake air, toward a downstream portion 70c at the rear, and therefore, the flow velocity of the intake air therein gradually increases from the front end portion 70a toward the downstream portion 70c. The duct body 70 is connected to the duct front 69 at the upstream side relative to the portion where the cross-sectional area is decreased, that is, at a location where the flow velocity is relatively low. Therefore, it is possible to suppress an increase in the flow passage resistance or pipe loss caused by a joint J (FIG. 4) between the duct front 69 and the duct body 70. At a position distant from the joint J, the duct front 69 is formed to have a larger cross-sectional area than the duct body 70. The duct body 70 is curved toward the inner side of the vehicle body in the vehicle widthwise direction at the downstream portion 70c, so as to be connected to the air cleaner 40.

That is, as shown in FIG. 5, a retraction space SP for moving the removed duct body 70 rearward is formed rearward of the downstream portion 70c of the duct body 70. The retraction space SP is formed such that its dimension d1 in the longitudinal direction is larger than a distance d2 from the front end portion 70a of the duct body 70 to the rear end of the fairing 22. This can prevent the duct body 70 from interfering with the vehicle body and vehicle-mounted components during removal of the duct body 70.

The air intake duct 50 shown in FIG. 3 includes a lowermost portion 50d at an intermediate portion in the flow direction of intake air I. As a result of providing the lowermost portion 50d at the intermediate portion as described above, the air intake duct 50 has a V-shape in side view. The lowermost portion 50d may be provided with a drain hole (not shown). However, the shape of the air intake duct 50 is not limited to such a V-shape and may be a straight shape.

Two attachment pieces 72 are provided on the upper surface of the duct front 69 so as to be aligned in the longitudinal direction. Via the attachment pieces 72, the duct front 69 is supported by a stay (not shown) provided on the inner surface of the fairing 22 shown in FIG. 5 by means of a bolt (not shown). That is, the duct front 69 is supported by the main frame 1 through the fairing 22.

Figure 6:
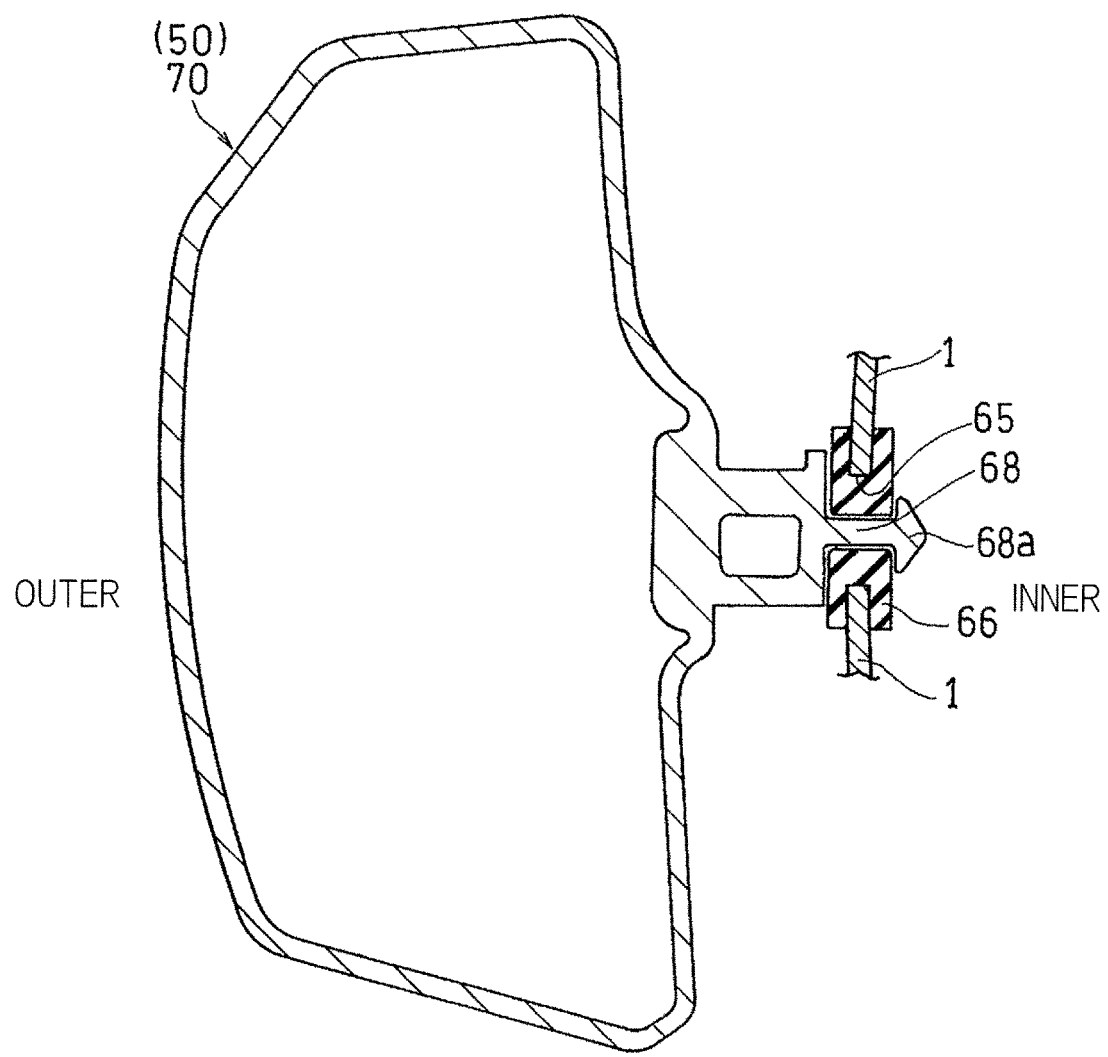
FIG. 6 is a longitudinal cross-sectional view showing an engagement portion between the air intake duct and a vehicle body frame.

A projection 68 protruding toward the main frame 1 is integrally formed on the duct body 70 by insert molding. The projection 68 is provided on the inner surface of an intermediate portion, in the longitudinal direction, of the duct body 70. As shown in FIG. 6, a tubular grommet 66 made of an elastic body such as rubber is mounted in an engagement hole 65 formed in the main frame 1. The projection 68 is inserted into a hollow of the grommet 66 from the outside to be engaged therewith and is retained by a bulging head portion 68a of the projection 68.

As described above, the duct body 50 shown in FIG. 5 is removably coupled at its front portion to the duct front 69 by means of the fastening member 77, is removably coupled at its rear portion to the air cleaner 40 by means of bolts 106 (FIG. 7) described below, and is removably supported at its intermediate portion in the longitudinal direction by the main frame 1 by means of the projection 68.

As shown in FIG. 6, the transverse cross-sectional shape of the duct body 50 is a rectangular shape having a long axis substantially in the vertical direction. More specifically, the transverse cross-sectional shape of the duct body 50 is a D-shape whose outer edge bulges outward in the vehicle widthwise direction in an arc shape.

The air cleaner 40 shown in FIG. 2 includes a case composed of two segments that are separable from each other in the right-left direction or vehicle widthwise direction. Specifically, the air cleaner 40 includes a case body 84 having the cleaner outlet 59 and a cover 85 having the cleaner inlet 57. A cleaner element 87 that purifies or filters intake air is interposed between the case body 84 and the cover 85. The case body 84 and the cover 85 are each formed of an aluminum alloy casting, and are coupled by means of a plurality of screw members 104 with the cleaner element 87 interposed therebetween.

Figure 7:
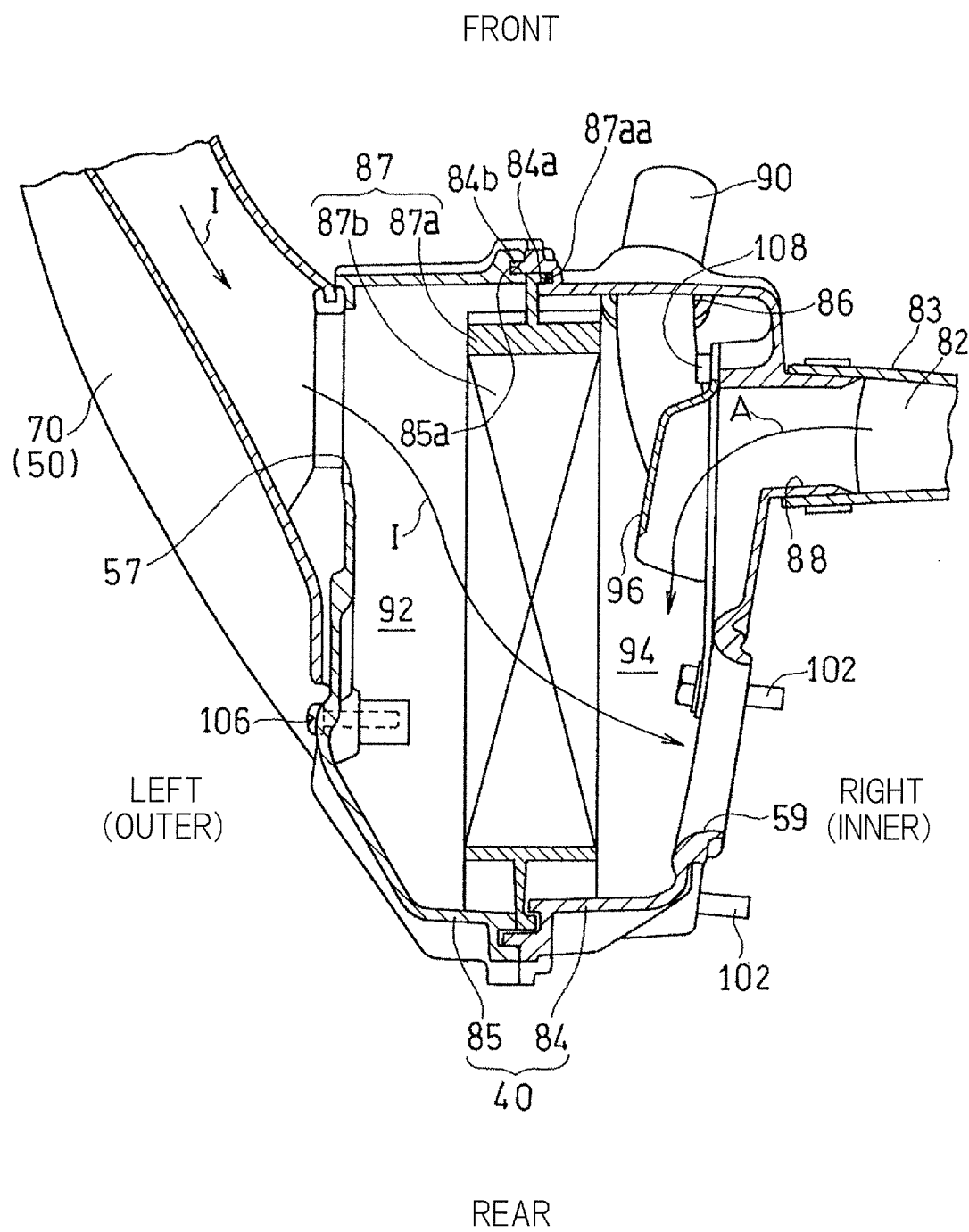
FIG. 7 is a horizontal cross-sectional view showing an air cleaner of the motorcycle.

Specifically, as shown in FIG. 7, the cleaner element 87 includes a holding portion 87a that forms a frame and a filter portion 87b held by the holding portion 87a, and the holding portion 87a is held between the case body 84 and the cover 85. More specifically, after an engagement protruding portion 87aa defined on the outer periphery of the holding portion 87a is fitted to a first engagement groove 84a provided on the joint surface of the case body 84, an engagement projection 84b provided on the joint surface of the case body 84 is engaged with a second engagement groove 85a provided on the joint surface of the cover 85. In this state, the case body 84 and the cover 85 are coupled by means of the screw members 104 shown in FIG. 2, whereby the cleaner element 87 is held between the case body 84 and the cover 85.

The rear end 50b of the air intake duct 50 is supported by the cover 85 by means of a plurality of screw members 106. That is, the cover 85 of the air cleaner 40 also serves as a support body that supports the rear end 50b of the air intake duct 50.

As shown in FIG. 7, the internal space of the cover 85 constitutes a dirty chamber 92 located upstream of the cleaner element 87 with respect to the flow direction of the intake air, and the internal space of the case body 84 constitutes a clean chamber 94 located downstream of the cleaner element 87 with respect to the flow direction of the intake air. That is, the intake air I guided by the air intake duct 50 is introduced through the cleaner inlet 57 into the dirty chamber 92 and is purified by the cleaner element 87.

The cleaned intake air I then enters the clean chamber 94 and is discharged through the cleaner outlet 59.

A blow-by gas introduction port 86 for guiding blow-by gas G inside the engine into the air cleaner 40, and a high-pressure air introduction port 88 are formed in the clean chamber 94. A connection pipe 90 extending from a breather chamber (not shown) of the engine E is inserted and connected to the blow-by gas introduction port 86. The relief pipe 83 extending from the relief valves 80 of the air intake chamber 52 shown in FIG. 2 is connected to the high-pressure air introduction port 88, and thus, the high-pressure air A is introduced into the air cleaner 40. The high-pressure air introduction port 88 shown in FIG. 7 is disposed above the blow-by gas introduction port 86. The blow-by gas introduction port 86 is open so as to be directed frontward, and the high-pressure air introduction port 88 is open so as to be directed toward the right lateral side.

The clean chamber 94 is provided with a protection member 96 for preventing the high-pressure air A discharged from the outlet of the relief passage 82 from directly striking the cleaner element 87. The protection member 96 is disposed between the high-pressure air introduction port 88 and the cleaner element 87 and is removably supported by the case body 84.

Figure 8:
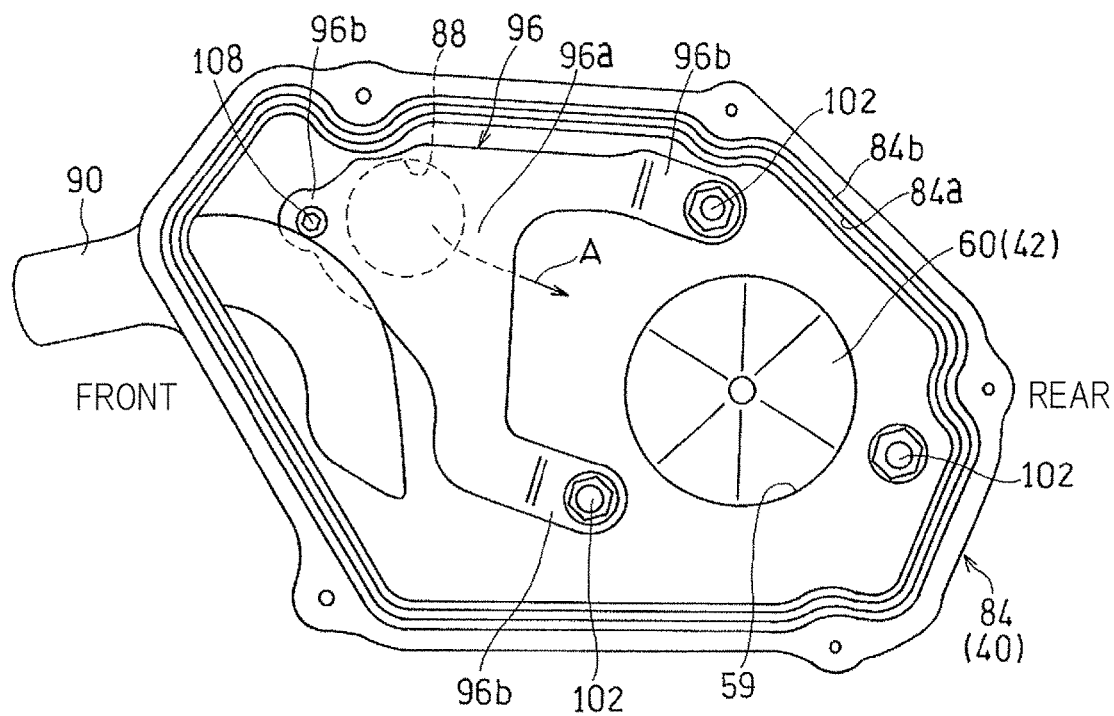
FIG. 8 is a side view of a case body of the air cleaner as viewed from the primary side.

FIG. 8 shows the inside of the case body 84. As shown in FIG. 8, the protection member 96 is formed by bending a plate member and includes: a body portion 96a that covers the high-pressure air introduction port 88 from the outside of the introduction port so as to guide the high-pressure air A to the cleaner outlet 59; and three supported portions 96b supported by the case body 84.

The supported portions 96b is formed at one location in the front and at two locations in the rear, respectively. The supported portions 96b at the two locations in the rear are fastened together to the case body 84 by means of the bolts 102 for fastening the air cleaner 40 to the supercharger 42. This suppresses an increase in the number of components. The supported portion 96b at the one location in the front is fixed to the case body 84 by means of a fastening member 108 such as a bolt.

Operation of the air intake apparatus IS will be described. When the motorcycle runs, incoming wind is taken into the air intake duct 50 as intake air I through the air inlet 24 shown in FIG. 1. The intake air I flows rearward inside the air intake duct 50, and is guided to the air cleaner 40 while changing its flow direction toward the inner side in the vehicle widthwise direction.

The intake air I guided to the air cleaner 40 is purified by the cleaner element 87 shown in FIG. 2 and then is introduced to the supercharger 42. The pressure of the intake air I introduced to the supercharger 42 is increased by the impeller 60, and the intake air I is thereafter discharged upward through the discharge port 48. The high-pressure air A discharged from the supercharger 42 is guided to the air intake chamber 52 located above the supercharger 42 and then supplied via the throttle body 44 shown in FIG. 1 to the air intake port 54 of the engine E.

When the pressure inside a supercharged air passage at the downstream side relative to the supercharger 42 with respect to the flow direction of the intake air becomes higher than a predetermined value, the relief valves 80 shown in FIG. 2 provided to the air intake chamber 52 are operated to open so as to adjust the pressure inside the supercharged air passage, including the air intake chamber 52. The high-pressure air A escaped from the relief valves 80 at this time is introduced through the relief pipe 83, which constitutes the relief passage 82, to the air cleaner 40 shown in FIG. 7.

The high-pressure air A introduced to the air cleaner 40 is guided back to the clean chamber 94 by the protection member 96.

On the other hand, during travelling of the motorcycle, the blow-by gas inside the engine E is separated in the breather chamber (not shown) inside the engine and then is introduced from the blow-by gas introduction port 86 through the connection pipe 90 into the clean chamber 94 of the air cleaner 40.

A method of replacing the cleaner element 87 of the air cleaner 40 will be described. First, the duct body 70 of the air intake duct 50 is removed from the vehicle body together with the cover 85 of the air cleaner 40. Specifically, the bolts 104 as the screw members shown in FIG. 1 are removed, and the fastening member 77 of the duct front 69 shown in FIG. 5 is further removed. In this state, the duct body 70 shown in FIG. 6 is pulled out to the outer lateral side, thereby to disengage the engagement hole 66 of the main frame 1 and the projection 68 of the duct body 70. Furthermore, the duct body 70 shown in FIG. 1 is moved rearward, and the duct body 70 is removed from the duct front 69. At this time, the duct body 70 is easily removed since the retraction space SP (FIG. 5) is formed rearward of the duct body 70.

Figure 9:
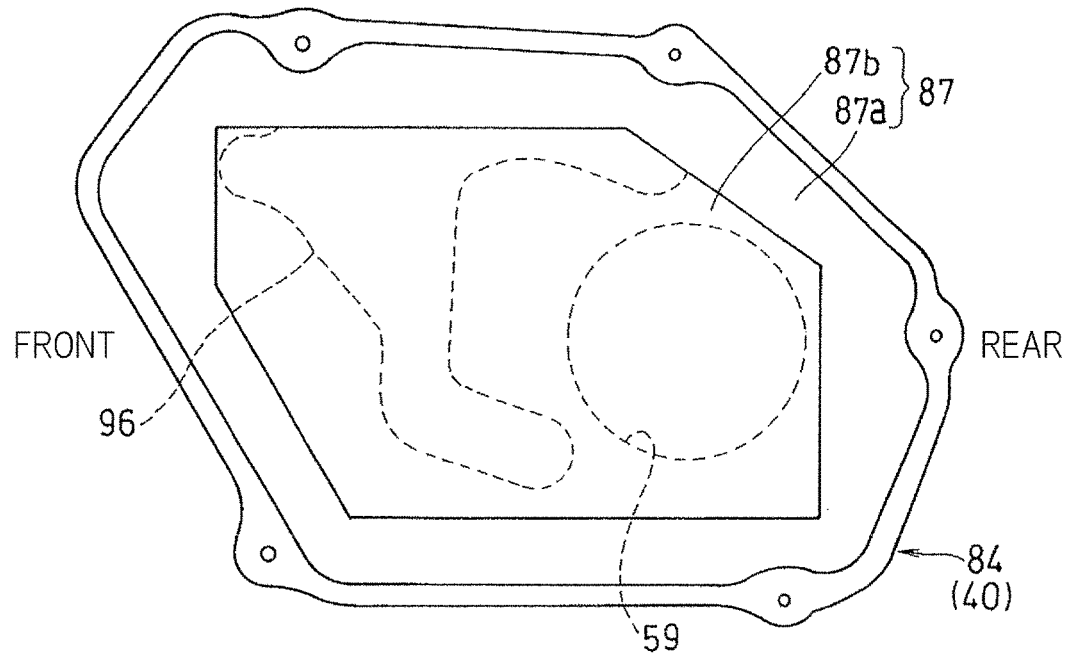
FIG. 9 is a side view of the case body with a cleaner element attached thereto, as viewed from the primary side.

Upon removal of the cover 85 and the duct body 70 shown in FIG. 7 from the vehicle body, the cleaner element 87 is exposed to the outside as shown in FIG. 9, which is a left side view. Accordingly, the cleaner element 87 can be easily replaced. After replacement of the cleaner element 87, the duct body 70 and the cover 85 are attached to the vehicle body by a procedure reversed from the removal procedure.

With the above-described configuration, it is made possible to access the cleaner element 87 of the air cleaner 40, by removing the duct body 70 while the duct front 69 is kept attached to the main frame 1. Accordingly, the cleaner element 87 can be easily attached and removed. Since the duct body 70 extends in the longitudinal direction so as to pass through the outer lateral side of the engine E, the duct body 70 can be easily accessed from the outer lateral side removed. Since the duct body 70 is connected to the cover 85, it is possible to remove the duct body 70 together with the cover 85 and replace the cleaner element 87.

Furthermore, during removal of the duct body 70 together with the cover 85, since the bolts 104 shown in FIG. 1 are exposed to the lateral side of the vehicle body and the fastening member 77 of the duct front 69 shown in FIG. 5 is exposed upward from the opening 79 of the fairing 22, the bolts 104 and the fastening member 77 can be easily removed. In addition, the duct body 70 can also be easily removed since the retraction space SP is formed rearward of the duct body 70.

The duct front 69 shown in FIG. 1 is covered in its entirety by the fairing 22 from the outer lateral side, and most of the duct body 70 is exposed to the outer lateral side from the fairing 22. This allows the joint J between the duct body 70 and the duct front 69 shown in FIG. 4 to be concealed to enhance the appearance, and enables the duct body 70 to be removed without removing the fairing 22.

The front end portion 70a of the duct body 70 is coupled to the rear end portion 69b of the duct front 69 by insertion in the longitudinal direction. This can assuredly prevent interference between the fairing 22 and the air intake duct 50 shown in FIG. 5 during attachment and removal of the duct body 50, as compared to the case where the connection is achieved by insertion in the vehicle widthwise direction.

The front end portion 70a of the duct body 70 shown in FIG. 4 covers the rear end portion 69b of the duct front 69 around the entire periphery from the radially outer side.

When the duct body 70 and the duct front 69 are connected such that the duct body 70 is located at the inner side, the front end face of the duct body 70 is exposed inward of the inner peripheral surface of the duct front 69 to form a step portion, thus resulting in a higher pressure resistance or pipe loss. In contrast, in the present embodiment, the duct body 70 and the duct front 69 are connected such that the front end portion 70a of the duct body 70 is located outward of the rear end portion 69b of the duct front 69, and therefore, no step portion is formed, thus resulting in a lower air resistance inside the air intake duct 50.

The duct body 70 and the duct front 69 shown in FIG. 5 are formed of materials different from each other, and the duct body 70 is formed of a material that can be more easily subjected to surface decoration treatment than the material of the duct front 69. Accordingly, by performing decoration treatment such as coating or metal plating on the surface of the duct body 70 exposed from the fairing 22, the appearance of the motorcycle is enhanced, and more options are available for the material of the non-exposed duct front 69, increasing the degree of freedom of design.

The duct body 70 is formed as a unitary article obtained by blow molding. Accordingly, a joint line which is present when the duct body 70 is formed by a plurality of segments is not present, resulting in a lower air resistance or pipe loss in the duct body 70. Furthermore, the projection 68 protruding toward the main frame 1 is integrally formed, by molding, on the inner surface of a center portion, in the longitudinal direction, of the duct body 70, and the projection 68 is engaged with the engagement hole 66 formed in the main frame 1. This makes it possible to support the center portion, in the longitudinal direction, of the duct body 70 while preventing an increase in the air resistance or pipe loss in the duct body 70.

As shown in FIG. 7, the clean chamber 94 is provided with the protection member 96 for preventing the high-pressure air A discharged from the relief passage 82 from directly striking the cleaner element 87, and it is therefore possible to protect the cleaner element 87 from being deformed by the high-pressure air A.

As shown in FIG. 9, the cleaner element 87 is attached over a wide area across the entire transverse cross-section of the case of the air cleaner 40. This reduces the intake air resistance of the cleaner element 87. As a result of providing the cleaner element 87 over the wide area as described above, the cleaner element 87 is larger in size than the suction port 46 of the supercharger 42 shown in FIG. 7 and opposes the high-pressure air introduction port 88. However, the provision of the protection member 96 can prevent the high-pressure air A from directly striking the cleaner element 87.

Although the air cleaner 40 is used as the inner device in the above-described embodiment, the inner device is not limited to the air cleaner 40, and may be any vehicle-mounted device that is located inward of the duct body 70 in the vehicle widthwise direction and is not accessible from the outside in a state in which the duct body 70 is attached to the vehicle body, but is accessible from the outside in a state in which the duct body 70 is removed from the vehicle body. Preferably, the inner device is an intake system device for the engine E, such as the air cleaner 40 and the supercharger 42. In particular, the inner device is preferably a device that requires periodical maintenance and replacement, such as the cleaner element 87.

The inner device is not limited to the intake system device for the engine E, and may be a device that is disposed at one side, in the vehicle widthwise direction, at which the air intake duct 50 is disposed, and is covered by the duct body 70 from the outer lateral side. For example, the inner device may be a device or an electrical component attached to the engine E. Examples of such devices and electrical components include various sensors, a relay switch, a starter switch, a harness connector, a throttle valve, and a throttle sensor. Various devices for driving the engine E are disposed rearward of the cylinder block 30 and the cylinder head 32 and above the crank case 28, and it is possible to access these devices by removing the duct body 50. By placing the air intake duct 50 at the outer lateral side of the engine E, it is possible to inhibit these various components from being exposed to the outside, without using a cowl, a cover, or the like. As a result, it is possible to achieve both of an enhanced appearance and protection of the various components.

The present invention is not limited to the embodiment described above, and various additions, modifications, or deletions may be made without departing from the gist of the present invention. For example, although the duct body 70 and the duct front 69 are formed of materials different from each other in the above-described embodiment, the duct body 70 and the front duct 69 may be formed of the same material by surface treatments different from each other. Specifically, since the duct front 69 is mostly covered by the fairing 22 and is not exposed to the outer lateral side of the vehicle body, and therefore the number of surface finishing steps may be made smaller than that for the duct body 70. This can reduce the production cost. For example, the duct front 69 is formed without being subjected to any surface treatment (without polishing or coating), whereas the surface of the duct body 70 is subjected to polishing, coating, and the like.

The duct front 69 may be exposed from the fairing 22. This is also encompassed by the present invention. The air cleaner 40 may be disposed at the front end portion of the duct body 70. The present invention is suitably used particularly for an engine that has a high flow velocity inside an air intake duct and whose output is significantly affected by a change in air intake resistance, such as an engine equipped with a supercharger.

REFERENCE NUMERALS

22 . . . fairing
24 . . . air inlet
40 . . . air cleaner (inner device)
42 . . . supercharger
50 . . . air intake duct
66 . . . engagement hole
68 . . . projection
69 . . . duct front
70 . . . duct body
77 . . . fastening member (for coupling front and rear ducts)
79 . . . opening
80 . . . relief valve
82 . . . relief passage
87 . . . cleaner element
94 . . . clean chamber
96 . . . protection member
E . . . engine
FR . . . vehicle body frame

What is claimed is:

1. An air intake duct for a motorcycle, which air intake duct supplies air taken in through an air inlet in a front portion of a vehicle body to an engine located at a center portion, in a longitudinal direction of the vehicle body, the air intake duct comprising:
- a duct body extending in the longitudinal direction so as to pass through a lateral side, in a vehicle widthwise direction, of the engine and removably connected at a rear end portion thereof to the engine; and
- a duct front removably coupled to a front end portion of the duct body, the duct front having the air inlet and being supported by a vehicle body frame, wherein
- the duct front is covered from an outer lateral side by a fairing located at the front portion of the vehicle body, and the duct body is exposed to the outer lateral side from the fairing, and
- in a state in which the duct body is removed from the engine, at least a portion of an inner device located inward of the duct body in the vehicle widthwise direction is exposed to enable the inner device to be attached and removed.

2. The air intake duct for the motorcycle as claimed in claim 1, wherein the front end portion of the duct body is coupled to a rear portion of the duct front by insertion in the longitudinal direction.

3. The air intake duct for the motorcycle as claimed in claim 1, wherein the duct body and the duct front are formed of materials different from each other.

4. The air intake duct for the motorcycle as claimed in claim 1, wherein
- the duct body and the duct front are removably connected at upper portions thereof by means of a fastening member, and
- the fairing covers the fastening member from the outer lateral side and has an opening for exposing the fastening member upward.

5. The air intake duct for the motorcycle as claimed in claim 1, wherein the front end portion of the duct body covers a rear end portion of the duct front around an entire periphery thereof from a radially outer side.

6. The air intake duct for the motorcycle as claimed in claim 1, wherein the duct body is foitned as a unitary article obtained by blow molding.

7. An air intake duct for a motorcycle which air intake duct supplies air taken in through an air inlet in a front portion of a vehicle body to an engine located at a center portion, in a longitudinal direction of the vehicle body, the air intake duct comprising:
- a duct body extending in a longitudinal direction so as to pass through a lateral side, in a vehicle widthwise direction, of the engine and removably connected at a rear end portion thereof to the engine; and
- a duct front removably coupled to a front end portion of the duct body, the duct front having the air inlet and being supported by a vehicle body frame, wherein
- in a state in which the duct body is removed from the engine, at least a portion of an inner device located inward of the duct body in the vehicle widthwise direction is exposed to enable the inner device to be attached and removed,
- a projection protruding toward the vehicle body frame is integrally formed on the duct body by molding, and
- the projection is engaged with an engagement hole formed in the vehicle body frame.

8. An air intake duct for a motorcycle, which air intake duct supplies air taken in through an air inlet in a front portion of a vehicle body to an engine located at a center portion, in a longitudinal direction of the vehicle body, the air intake duct comprising:
- a duct body extending in the longitudinal direction so as to pass through a lateral side, in a vehicle widthwise direction, of the engine and removably connected at a rear end portion thereof to the engine; and
- a duct front removably coupled to a front end portion of the duct body, the duct front having the air inlet and being supported by a vehicle body frame, wherein
- in a state in which the duct body is removed from the engine, at least a portion of an air cleaner located inward of the duct body in the vehicle widthwise direction is exposed to enable the air cleaner to be attached and removed.

9. An air intake apparatus for a motorcycle, comprising:
- an air intake duct, which supplies air taken in through an air inlet in a front portion of a vehicle body to an engine located at a center portion, in a longitudinal direction of the vehicle body;
- a cleaner element configured to clean air taken in from the air intake duct;
- a supercharger connected to a downstream side of the cleaner element with respect to a flow direction of the air;
- a relief valve configured to adjust a pressure at a downstream side of the supercharger with respect to the flow direction of the air; and
- a relief passage through which an outlet of the relief valve communicates with a clean chamber located at a downstream side of the cleaner element with respect to the flow direction of the air, wherein
- the air intake duct comprises:
- a duct body extending in the longitudinal direction so as to pass through a lateral side, in a vehicle widthwise direction, of the engine and removably connected at a rear end portion thereof to the engine; and
- a duct front removably coupled to a front end portion of the duct body, the duct front having the air inlet and being supported by a vehicle body frame,
- in a state in which the duct body is removed from the engine, at least a portion of an inner device located inward of the duct body in the vehicle widthwise direction is exposed to enable the inner device to be attached and removed, and
- the clean chamber is provided with a protection member configured to prevent relief air discharged from an outlet of the relief passage from directly striking the cleaner element.

* * * * *